United States Patent
Panamarathupalayam

(10) Patent No.: US 10,968,380 B2
(45) Date of Patent: Apr. 6, 2021

(54) CROSSLINKED SYNTHETIC POLYMER-BASED RESERVOIR DRILLING FLUID

(71) Applicant: M-I L.L.C., Houston, TX (US)

(72) Inventor: Balakrishnan Panamarathupalayam, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 592 days.

(21) Appl. No.: 15/400,422

(22) Filed: Jan. 6, 2017

(65) Prior Publication Data

US 2017/0198189 A1    Jul. 13, 2017

Related U.S. Application Data

(60) Provisional application No. 62/276,080, filed on Jan. 7, 2016.

(51) Int. Cl.
| | | |
|---|---|---|
| *E21B 21/00* | (2006.01) | |
| *C09K 8/52* | (2006.01) | |
| *C08F 220/54* | (2006.01) | |
| *C09K 8/508* | (2006.01) | |
| *C09K 8/512* | (2006.01) | |
| *E21B 37/00* | (2006.01) | |
| *C09K 8/035* | (2006.01) | |
| *E21B 37/08* | (2006.01) | |
| *E21B 43/08* | (2006.01) | |
| *E21B 43/10* | (2006.01) | |
| *E21B 43/25* | (2006.01) | |
| *C08F 220/56* | (2006.01) | |
| *C09K 8/12* | (2006.01) | |
| *G01V 3/20* | (2006.01) | |
| *G01V 3/34* | (2006.01) | |
| *C08F 212/14* | (2006.01) | |
| *C08F 228/02* | (2006.01) | |

(52) U.S. Cl.
CPC .............. *C09K 8/52* (2013.01); *C08F 220/54* (2013.01); *C08F 220/56* (2013.01); *C09K 8/035* (2013.01); *C09K 8/12* (2013.01); *C09K 8/5083* (2013.01); *C09K 8/512* (2013.01); *E21B 21/003* (2013.01); *E21B 37/00* (2013.01); *E21B 37/08* (2013.01); *E21B 43/082* (2013.01); *E21B 43/10* (2013.01); *E21B 43/25* (2013.01); *G01V 3/20* (2013.01); *G01V 3/34* (2013.01); *C08F 212/14* (2013.01); *C08F 228/02* (2013.01); *C09K 2208/26* (2013.01)

(58) Field of Classification Search
None
See application file for complete search history.

(56) References Cited

U.S. PATENT DOCUMENTS

| | | | |
|---|---|---|---|
| 4,293,427 A | | 10/1981 | Lucas et al. |
| 4,547,299 A | | 10/1985 | Lucas |
| 5,100,660 A | * | 3/1992 | Hawe ................... A61K 8/8158 422/12 |
| 5,789,349 A | * | 8/1998 | Patel ........................ C09K 8/24 507/118 |
| 7,066,260 B2 | | 6/2006 | Sullivan et al. |
| 8,835,364 B2 | | 9/2014 | Thompson et al. |
| 9,158,025 B2 | | 10/2015 | Forgang |
| 9,695,350 B2 | | 7/2017 | Chung et al. |
| 10,214,677 B2 | * | 2/2019 | Panamarathupalayam .................. C08F 220/56 |
| 2001/0009889 A1 | | 7/2001 | Waggenspack et al. |
| 2002/0036088 A1 | * | 3/2002 | Todd ...................... C09K 8/08 166/300 |
| 2008/0200354 A1 | | 8/2008 | Jones et al. |
| 2009/0114394 A1 | | 5/2009 | Javora et al. |
| 2009/0197781 A1 | | 8/2009 | Sunkara |
| 2010/0048430 A1 | * | 2/2010 | Funkhouser ........... C09K 8/685 507/219 |
| 2010/0063738 A1 | | 3/2010 | Roy et al. |
| 2010/0163228 A1 | | 7/2010 | Abad et al. |
| 2010/0210482 A1 | | 8/2010 | Fox |
| 2011/0168393 A1 | * | 7/2011 | Ezell ...................... C09K 8/512 166/300 |
| 2011/0221883 A1 | | 9/2011 | Johnston |
| 2011/0284228 A1 | * | 11/2011 | Huang ..................... C09K 8/52 166/308.1 |
| 2012/0018226 A1 | | 1/2012 | Nzeadibe et al. |
| 2012/0131996 A1 | | 5/2012 | Anish et al. |
| 2012/0138299 A1 | | 6/2012 | Joseph et al. |

(Continued)

FOREIGN PATENT DOCUMENTS

| | | |
|---|---|---|
| CN | 102459501 A | 5/2012 |
| JP | 2014507487 A | 3/2014 |

(Continued)

OTHER PUBLICATIONS

International Search Report and Written Opinion issued in International Application No. PCT/US2017/012578 dated Apr. 24, 2017 (16 pp.).
Office Action dated Sep. 11, 2017, issued by the U.S. Patent and Trademark Office in related U.S. Appl. No. 15/400,354 (11 pages).
International Search Report and Written Opinion dated Apr. 13, 2017, issued by the Korean Intellectual Property Office (KIPO) in related International Application No. PCT/US2017/012603 (14 pages).
Office Action dated Mar. 8, 2018, issued by the U.S. Patent and Trademark Office in corresponding U.S. Appl. No. 15/400,354 (5 pages).

(Continued)

*Primary Examiner* — Andrew Sue-Ako

(57) ABSTRACT

A wellbore fluid includes a base fluid; and a crosslinked and branched polymeric fluid loss control agent formed from at least an acrylamide monomer and a sulfonated anionic monomer; wherein the fluid loss control agent has an extent of crosslinking that is selected so that the fluid loss control agent has a viscosity that is within a peak viscosity response of the viscosity response curve.

20 Claims, No Drawings

(56) References Cited

U.S. PATENT DOCUMENTS

| | | | |
|---|---|---|---|
| 2013/0030707 A1 | 1/2013 | Tabarovsky et al. |
| 2014/0121136 A1 | 5/2014 | Mirakyan et al. |
| 2014/0131045 A1 | 5/2014 | Loiseau et al. |
| 2014/0352962 A1 | 12/2014 | Chung et al. |
| 2015/0000985 A1 | 1/2015 | Zhou et al. |
| 2015/0005206 A1 | 1/2015 | Zhou et al. |
| 2015/0021027 A1 | 1/2015 | Chapman |
| 2015/0021098 A1 | 1/2015 | Kippie |
| 2015/0101805 A1 | 4/2015 | Svoboda et al. |
| 2015/0191640 A1 | 7/2015 | Lee et al. |
| 2015/0204188 A1 | 7/2015 | Massam et al. |
| 2015/0284619 A1 | 10/2015 | Price Hoelscher et al. |

FOREIGN PATENT DOCUMENTS

| | | | |
|---|---|---|---|
| JP | 2015528032 A | 9/2015 |
| WO | 2005095755 A1 | 10/2005 |
| WO | 2015037672 A1 | 3/2015 |
| WO | 2017120499 A1 | 7/2017 |
| WO | 2017120520 A2 | 7/2017 |
| WO | 2017199296 A1 | 11/2017 |

OTHER PUBLICATIONS

International Search Report and Written Opinion issued in International Application No. PCT/US2017/012574 dated Apr. 24, 2017 (14 pages).
Office Action dated May 17, 2018, issued by the U.S. Patent and Trademark Office in corresponding U.S. Appl. No. 15/400,438 (20 pages).
Office Action issued in counterpart Indonesian patent application PID201805502 dated Sep. 15, 2020, 4 pages.
International Preliminary Report on Patentability issued in International Patent application PCT/US2017/012574 dated Jul. 10, 2018, 9 pages.
Examination Report issued in Australian Patent Application 2017205639 dated Nov. 20, 2018, 3 pages.
International Preliminary Report on Patentability issued in International Patent application PCT/US2017/012578 dated Jul. 10, 2018, 10 pages.
Examination Report issued in Australian Patent Application 2017206053 dated Nov. 26, 2018, 3 pages.
International Preliminary Report on Patentability issued in International Patent application PCT/US2017/012603 dated Jul. 10, 2018, 13 pages.
First Examination Report issued in Australian Patent Application 2017206066 dated Jul. 19 2019, 4 pages.
Second Examination Report issued in Australian Patent Application 2017206066 dated Oct. 1 2019, 3 pages.

* cited by examiner

CROSSLINKED SYNTHETIC POLYMER-BASED RESERVOIR DRILLING FLUID

CROSS-REFERENCE TO RELATED APPLICATIONS

This application claims priority to U.S. Patent Application No. 62/276,080 filed on Jan. 7, 2016, which is incorporated herein by reference.

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

However, another wellbore fluid used in the wellbore following the drilling operation is a completion fluid. Completion fluids broadly refer to any fluid pumped down a well after drilling operations have been completed, including fluids introduced during acidizing, perforating, fracturing, workover operations, etc. Reservoir drill-in fluid (RDF) is a specific type of drilling fluid that is designed to drill and complete the reservoir section of a well in an open hole, i.e., the "producing" part of the formation. Such fluids are designed to balance the properties of the reservoir with drilling and completion processes. In particular, it is desirable to protect the formation from damage and fluid loss, and not impede future production. Many RDFs contain several solid materials including viscosifiers, drill solids, and additives used as bridging agents to prevent lost circulation.

During drilling, a filter cake may build up on the walls of a wellbore in which varying sizes and types of particles accumulate. This filter cake may be removed during the initial state of production, either physically, through washing action of circulating fluids, or by using chemical treatments, e.g., acids, oxidizers, enzymes, and the like. The amount and type of drill solids present in the filter cake may also affect the effectiveness of clean up treatments, in addition to the presence of polymeric additives that may be resistant to degradation using chemical treatments.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a wellbore fluid that includes a base fluid; and a crosslinked and branched polymeric fluid loss control agent formed from at least an acrylamide monomer and a sulfonated anionic monomer; wherein the fluid loss control agent has an extent of crosslinking that is selected so that the fluid loss control agent has a viscosity that is within a peak viscosity response of the viscosity response curve.

In another aspect, embodiments disclosed herein relate to a method of drilling a wellbore that includes pumping a wellbore fluid into a wellbore through an earthen formation, the wellbore fluid including a base fluid; and a crosslinked and branched polymeric fluid loss control agent formed from at least an acrylamide monomer and a sulfonated anionic monomer; wherein the fluid loss control agent has an extent of crosslinking that is selected so that the fluid loss control agent has a viscosity that is within a peak viscosity response of the viscosity response curve; operating a drilling tool in the wellbore during the pumping.

Other aspects and advantages of the claimed subject matter will be apparent from the following description and the appended claims.

DETAILED DESCRIPTION

In one aspect, embodiments disclosed herein relate to wellbore fluid additives for downhole applications such as mitigation of fluid loss and maintenance of fluid viscosity. Wellbore fluids in accordance with the present disclosure may contain chemically crosslinked and branched polymeric fluid loss additives, including branched and crosslinked copolymers of acrylamide and a sulfonated anionic monomer. In some embodiments, wellbore fluid additives in accordance with the present disclosure may be used in high temperature high pressure (HTHP) applications and may impart stable viscosity and gel strength when used in wellbore fluid formulations under extreme conditions.

During drilling, a filter cake may build up as particles and materials of varying sizes and types from wellbore fluids are deposited and accumulate on the walls of the borehole. Prior to production, the filter cake may be removed to some degree, either physically or chemically using breaker fluids that may contain acids, oxidizers, and/or enzymes, for example. However, additives used in standard drilling fluids such as weighting solids and polymeric fluid loss materials may be resistant to degradation and conventional breaker fluids leaving residues that may hinder efficient hydrocarbon production, particularly when drilling fluid residues are present in producing intervals.

In order to overcome possible issues of formation damage associated with standard drilling fluids, a specialty fluid having a limited amount of solids and often degradable polymeric additives known as a reservoir drill-in fluid (RDF) may be used when drilling through the reservoir section of a wellbore. Particularly, RDFs may be formulated to minimize damage and maximize production of exposed zones. In some respects, an RDF may resemble a completion fluid. For example, drill-in fluids may be brines containing only selected solids of appropriate particle size ranges (often removable salts such as calcium carbonate) and fluid loss additives. Because completeness of removal and maximization of production of hydrocarbons can be significant weighting factors, it may be desirable in some embodiments to limit the inclusion of additives into the drill-in fluid to those associated with filtration control and removal of cuttings from the wellbore.

Wellbore fluids in accordance with the present disclosure may contain polymeric fluid loss control additives that withstand HTHP conditions, yet clean up with breaker fluids and be suitable for clean drilling and reservoir drill-in applications. During standard wellbore operation, wellbore fluids are often formulated with a number of polymeric additives to tune the viscosity and gel strength of the fluid such that wellbore fluids maintain the ability to suspend particulate additives and drill cuttings, particularly when circulation is stopped. Another function of the drilling fluid is its ability to seal permeable formations exposed by the bit with a low permeability filter cake. Seals are often by created by wellbore fluid additives such as polymers or bridging agents accumulating to form a filter cake on the walls of the wellbore.

However, rheological characteristics of wellbore fluids may be difficult to control because of the adverse conditions under which wellbore fluids are used, including high temperature, high shear (caused by the pumping and placement), high pressures, and low pH. For example, when drilling of certain deep wells, e.g., greater than 15,000 feet, or in geothermally active formations, temperatures may be such that thermal decomposition of certain drilling fluid additives occurs, which can cause detrimental changes in viscosity and flow characteristics that negatively affect the overall drilling operation.

Under HTHP conditions, polymeric materials used to viscosify wellbore fluids and provide a measure of fluid loss control may degrade, causing changes in the rheology of the fluid and may place additional strain on wellbore equipment. Exposure to HTHP conditions can have a detrimental effect on viscosifying agents, resulting in a loss in viscosity of the fluid at high temperatures. A breakdown of the rheology can limit or eliminate the ability of the wellbore fluid to suspend solids entrained within it (such as weighting agents, bridging agents or drill cuttings) and may lead to settlement, loss in fluid density, possible blowout of the well, or the like.

Specialized additives for HTHP conditions often contain polymeric materials that have exceptional resistance to extreme conditions, but can require specialized cleanup fluids to remove. For example, many cellulose and cellulose derivatives used as viscosifiers and fluid loss control agents degrade at temperatures around 200° F. and higher. Hydroxyethyl cellulose, on the other hand, is considered sufficiently stable to be used in an environment of no more than about 225° F. (107° C.). Likewise, because of the high temperature, high shear, high pressures, and low pH to which well fluids are exposed, xanthan gum is considered stable to be used in an environment of no more than about 290 to 300° F. (143 to 149° C.). However, the thermal stability of polymers such as xanthan gum may also contribute to decreased well productivity. As a result, expensive and often corrosive breaker fluids have been designed to disrupt filter cakes and residues left by these polymers, but beyond costs, the breakers may also result in incomplete removal and may be hazardous or ineffective under HTHP conditions.

In some embodiments, wellbore fluid additives in accordance with the present disclosure may also exhibit enhanced cleanup properties, and allow for use as brine viscosifiers and fluid loss additives in wellbore operations that may be sensitive to the amount of formation damage caused by standard drilling fluid additives. To this end, wellbore fluids and methods in accordance with the present disclosure may be used to treat fluid loss in some embodiments, for example, by formulating a drilling fluid or fluid loss pill with a crosslinked fluid loss control additive.

Wellbore fluids in accordance with the present disclosure that may be formulated as a RDF and may contain crosslinked fluid loss control additives that aid in the removal of formation cuttings during drilling, yet may be removed using breaker fluids. Other applications for wellbore fluids formulated in accordance with the present disclosure include coiled tubing applications, completions, displacement, hydraulic fracturing, work-over, packer fluid emplacement or maintenance, well treating, or testing operations. In some embodiments, wellbore fluids in accordance with the present disclosure may be formulated as an RDF used in under-reaming in highly permeable and/or poorly consolidated formations when expanding a wellbore in a hydrocarbon-bearing formation to a wider diameter.

Crosslinked Fluid Loss Control Agent

Wellbore fluid formulations in accordance with the present disclosure may contain crosslinked polymeric fluid loss control agents that may include a copolymer formed from at least one acrylamide monomer and at least one sulfonated anionic monomer. In other embodiments, crosslinked and branched fluid loss control agents may also include higher order copolymers and block copolymers such as terpolymers, quaternary polymers, and the like, including at least one acrylamide monomer, at least one sulfonated anionic monomer, and optionally other monomers as well.

In one aspect, wellbore fluids of the present disclosure incorporate a crosslinked and branched polymeric fluid loss control agent that is formed from at least an acrylamide monomer and a sulfonated anionic monomer. In one or more embodiments, crosslinked and branched fluid loss control agents may include polymers and copolymers synthesized from a mixture of monomers that may include acrylamide-based monomers. Acrylamide-based monomers in accordance with the present disclosure may play a role in creating an effective and high temperature stable fluid loss control agents, enhancing the fluid's high temperature endurance. In addition to unsubstituted acrylamide monomers, acrylamide-based monomers may also include N-substituted acrylamides, such as alkylacrylamides, N-methylol, N-isopropyl, diacetone-acrylamide, N-alkyl acrylamide (where alkyl is $C_1$ to $C_{14}$), N,N-dialkyl acrylamides (where alkyl is $C_1$ to $C_{14}$), N-cycloalkane acrylamides, combinations of the above and related compounds.

The crosslinked fluid loss control agents may also contain one or more sulfonated anionic monomers. While not limited to a particular theory, incorporation of anionic monomers may increase stability when added to a copolymer by repelling negatively charged hydroxide ions that promote hydrolysis of the acrylamide moiety of the polymer. Sulfonated anionic monomers, such as 2-acrylamide-2-methyl-propanesulfonic acid (AMPS®), a trademark of the Lubrizol Corporation—also referred to as acrylamide tertiary butyl sulfonic acid (ATBS), vinyl sulfonate, styrene sulfonic acid, and the like, may provide tolerance to divalent cations such as calcium and magnesium encountered in drilling fluids. Thus, the incorporation of sulfonated anionic monomers may result in an improved thermally stable fluid loss control agent for divalent cation systems, including brine based drilling fluids. Depending upon the reactivity ratio and the end use of the polymer, other sulfonated monomers may also be utilized for preparing an effective fluid loss control agent.

Further, it is also within the scope of the present disclosure that other monomers can be incorporated into the crosslinked polymer composition depending upon the end use of the polymer or the type of aqueous base drilling fluid. For example, lipophilic monomers, such as isobornyl methacrylate, 2-ethyl hexyl acrylate, N-alkyl and N,N-dialkyl acrylamide, styrene and the like can be incorporated to improve the performance of the polymer in high brine containing drilling fluids. Also, to make it more tolerant to other electrolytes, anionic monomers, such as maleic acid, tetrahydrophthalic acid, fumaric acid, acrylic acid and the like can be incorporated into the crosslinked polymers.

In one or more embodiments, crosslinked fluid loss control agents may contain covalent intermolecular crosslinking depending on the desired functional characteristics of the polymer. In one or more embodiments, the extent of crosslinking may be selected to maximize the viscosity of the resulting polymer in solution. In one or more embodiments, a crosslinked fluid loss control agent may exhibit a bell-curve type response for its viscosity in solution as the quantity of crosslinker used to crosslink the co-polymer is increased. That is, the viscosity initially increases as the quantity of crosslinker (and thus the crosslinks) are increased until a peak viscosity is reached, at which point the viscosity decreases and eventually results in a substantially zero slope as the quantity of crosslinker is further increased. In one or more embodiments, the crosslinked fluid loss control agent used in the RDF may be synthesized with an amount of crosslinker, and thus extent of crosslinking, so that its viscosity response is in the higher viscosity region of the bell-curve described above. For example, in one or more embodiments, the extent of crosslinking in the crosslinked fluid loss control agent may be selected so that the viscosity of fluid loss control agent is within a peak viscosity response of the viscosity response curve (created by plotting viscosity as a function of crosslinker under otherwise constant conditions). In one or more embodiments, the peak viscosity response may be defined as the amount of crosslinker that correlates to the peak amount plus or minus the amount of crosslinker that correlates to up to 75% of the area under the viscosity response curve that terminates upon reaching substantially zero slope. In more particular embodiments, the amount of crosslinker may be that which correlates to within 50%, or in some embodiments 25%, of the area under the viscosity response curve.

In one or more embodiments, the peak viscosity response may be expressed as the amount of crosslinker that correlates to the peak amount plus or minus the amount of crosslinker that correlates to 1.5 standard deviations from the peak amount. In more particular embodiments, the amount of crosslinker correlates to the peak amount plus or minus the amount of crosslinker that correlates to 1.0 standard deviations from the peak amount or from 0.5 standard deviations in even more particular embodiments. Further, in one or more embodiments, the peak viscosity response may be expressed as the amount of crosslinker that correlates to the peak amount plus or minus 50% of the peak amount. In more particular embodiments, the amount of crosslinker is the peak amount plus or minus 30% or 20% of the peak amount. Further, based on the above, one of ordinary skill in the art would appreciate that the breadth of the amount of crosslinker (and selection of amount of crosslinker) may depend, for example, on the shape of the viscosity response curve and the desired theological properties for the wellbore fluid and its particular application.

Crosslinking may be achieved, for example, by incorporation of crosslinking monomers such as methylenebisacrylamide, divinyl benzene, allylmethacrylate, tetra allyloxethane or other allylic bifunctional monomers. The crosslinked fluid loss control agent may have a percentage of intermolecular crosslinking that ranges from 0.25% to 10% in some embodiments, from 0.5% to 5% in other embodiments, and from 0.75% to 2.5% in other embodiments.

Wellbore fluids of the present disclosure may also exhibit temperature stability up to 250° F. (121° C.) in some embodiments, or greater that 250° F. (121° C.) in other embodiments. For example, in one or more embodiments, wellbore fluids of the present disclosure may exhibit temperature stability up to 300° F., or up to 350° F., or up to 400° F., or up to 450° F. Temperature stability may be described herein as the ability of the fluid to maintain suitable rheology at the temperature indicated above for at least five days. In one or more embodiments, a wellbore fluid of the present disclosure may exhibit low end rheology (i.e., rheology at 3 and 6 rpm) that does not deviate by more than 30 percent under the elevated temperature conditions indicated above when compared to the low end rheology at temperatures below about 250° F. In one or more embodiments, the rheology at 3 rpm, when tested at 120° F., for fluids according to the present disclosure may be at least 5 under any of the temperature conditions described above. In one or more embodiments, crosslinked fluid loss control additives may be added to a wellbore fluid at a concentration that that ranges from a lower limit selected from the group of 0.5, 1, 2.5, and 3 lb/bbl, to an upper limit selected from the group of 5, 10, 12, and 15 lb/bbl, where the concentration may range from any lower limit to any upper limit. The amount needed will vary, of course, depending upon the type of wellbore fluid, contamination, and temperature conditions.

In one or more embodiments, the polymeric fluid loss control agent may have an average molecular weight that ranges from a lower limit selected from the group of 250, 500, and 1,000 Da, to an upper limit selected from the group of 100, 250, 500, and 1,000 kDa, where the molecular weight may range from any lower limit to any upper limit. As used herein, molecular weight refers to weight average molecular weight (Mw) unless indicated otherwise.

In one or more embodiments, crosslinked fluid loss control agents may be a copolymer having a ratio of acrylamide monomer and sulfonated anionic monomer that ranges from 0.5:1 to 10:1. In some embodiments, a ratio of acrylamide monomer and sulfonated anionic monomer may range from 1:1 to 5:1

Crosslinked Polyvinylpyrrolidone

In one or more embodiments, crosslinked polyvinylpyrrolidone may also be added to wellbore fluids in accordance with the present disclosure to alter or maintain the rheological properties of the fluid, such as to maintain suspension properties for solids (including weight material, bridging agents, or cuttings) or other components within the fluid. In some embodiments, crosslinked polyvinylpyrrolidone polymers may include polyvinylpyrrolidone homopolymers, copolymers, or block copolymers containing one or more polyvinylpyrrolidone domains that have been crosslinked using various chemical reagents.

Crosslinked PVP may include crosslinking via intramolecular covalent chemical bonds, which are not adversely effected by salt or pH conditions. In one embodiment, the crosslinked polyvinylpyrrolidones may be added to a wellbore fluid at a concentration that that ranges from a lower limit selected from the group of 0.5, 1, 2.5, and 3 lb/bbl, to an upper limit selected from the group of 5, 10, 12, and 15 lb/bbl, where the concentration may range from any lower limit to any upper limit. The amount needed will vary, of course, depending upon the type of wellbore fluid, contamination, and temperature conditions.

The crosslinked PVP may have a percentage of intermolecular crosslinking that ranges from 0.25% to 10% in some embodiments, and from 0.5% to 5% in other embodiments.

When the crosslinked PVP is included, the ratio of the concentration crosslinked fluid loss control agent to the crosslinked PVP may be within a range of 1:1 to 5:1 in some embodiments, and from 1:1 to 3:1 in other embodiments.

Glycol Solvent

In one or more embodiments, crosslinked fluid loss control additives and/or crosslinked polyvinylpyrrolidones in accordance with the present disclosure may be hydrated with a glycol solvent prior to addition to a wellbore fluid. Hydrating the polymer additives of the present disclosure in a glycol solvent prior to use in a wellbore operation may ensure that the viscosity of the fluid and the fluid loss control properties of the fluid are stable during use, and, further, that the polymer additives remain in an unfolded configuration in solution and resist precipitation. For example, exposing polymer additives that are incompletely hydrated to wellbore fluids that often contain high ionic strength additives may initiate sedimentation and crashing out of the polymer.

Glycol solvents in accordance with the present disclosure may include oligomers of hydroxyalkylenes having 2-5 carbons and one or more hydroxyl groups. In some embodiments, glycol solvents may contain 1-5 propylene or ethylene units such as ethylene glycol, diethylene glycol, propylene glycol, dipropylene glycol, tripropylene glycol, and glycol ethers prepared from polyhydroxyalkylenes reacted with a to a linear or branched alkyl group such as diethylene glycol monoethyl ether, dipropylene glycol monomethyl ether, tripropylene glycol monomethyl ether, ethylene glycol monobutyl ether, ethylene glycol dibutyl ether, diethylene glycol monoethyl ether, diethyleneglycol monomethyl ether, tripropylene butyl ether, dipropylene glycol butyl ether, diethylene glycol butyl ether, butylcarbitol, dipropylene glycol methyl ether, propylene glycol n-propyl ether, propylene glycol t-butyl ether, and the like.

Base Fluids

In one or more embodiments, crosslinked fluid loss control additives and/or crosslinked polyvinylpyrrolidones in accordance with the present disclosure may be hydrated by their simple addition to a base fluid. For example, the crosslinked fluid loss control additives may be hydrated by free water upon their addition to water or a brine used a base fluid. In one or more embodiments, the fluid of the present disclosure may have an aqueous base fluid, the fluid being a monophasic fluid, in which the above mentioned polymers are included. The aqueous medium of the present disclosure may be water or brine. In those embodiments of the disclosure where the aqueous medium is a brine, the brine is water comprising an inorganic salt or organic salt. The salt may serve to provide desired density to balance downhole formation pressures, and may also reduce the effect of the water based fluid on hydratable clays and shales encountered during drilling. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, zinc, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts.

In some embodiments, the fluid may be a divalent halide is selected from the group of alkaline earth halides or zinc halides. The brine may also comprise an organic salt, such as sodium, potassium, or cesium formate. Inorganic divalent salts include calcium halides, such as calcium chloride or calcium bromide. Sodium bromide, potassium bromide, or cesium bromide may also be used. The salt may be chosen for compatibility reasons, i.e. where the reservoir drilling fluid used a particular brine phase and the completion/clean up fluid brine phase is chosen to have the same brine phase.

Additives

In one embodiment, the drilling fluid of the disclosure may further contain other additives and chemicals that are known to be commonly used in oilfield applications by those skilled in the art. A variety of additives can be included in the aqueous based drilling fluid of this disclosure with the purpose of formation of a thin, low permeability filter cake which seals pores and other openings in the formations which are penetrated by the bit. Such additives may include thinners, weighting material, gelling agents, shale inhibitors, pH buffers, etc.

Wellbore fluids of the present disclosure may contain other materials needed to form complete drilling fluids. Such other materials optionally may include, for example: additives to reduce or control low temperature rheology or to provide thinning, additives for enhancing viscosity, additives for high temperature high pressure control, and emulsion stability.

Examples of wellbore fluid thinners that may be used include lignosulfonates, lignitic materials, modified lignosulfonates, polyphosphates and tannins. In other embodiments low molecular weight polyacrylates can also be added as thinners. Thinners are added to a drilling fluid in order to reduce flow resistance and gel development. Other functions performed by thinners include the reduction of filtration and cake thickness, to counteract the effects of salts, to minimize the effects of water on the formations drilled, to emulsify oil in water, and to stabilize mud properties at elevated temperatures.

The HTHP wellbore fluids of the present disclosure additionally include an optional weighting material, sometimes referred to as a weighting agent. The type and quantity of weighting material used may depend upon the desired density of the final drilling fluid composition. Weight materials include, but are not limited to: barite, iron oxide, calcium carbonate, magnesium carbonate, and combinations of such materials and derivatives of such materials. The weight material may be added in a quantity to result in a drilling fluid density of up to 24 pounds per gallon. In an embodiment, the particulate weighting agent may be composed of an acid soluble material such as calcium carbonate, magnesium carbonate, $Mn_3O_4$, etc.

The solid weighting agents may be of any particle size (and particle size distribution), but some embodiments may include weighting agents having a smaller particle size range than API grade weighing agents, which may generally be referred to as micronized weighting agents. Such weighting agents may generally be in the micron (or smaller) range, including submicron particles in the nanosized range. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In one or more embodiments, an amine stabilizer may be used as a pH buffer and/or thermal extender to prevent acid-catalyzed degradation of polymers present in the fluid. A suitable amine stabilizer may include triethanolamine; however, one skilled in the art would appreciate that other amine stabilizers such as methyldiethanol amine (MDEA), dimethylethanol amine (DMEA), diethanol amine (DEA), monoethanol amine (MEA), cyclic organic amines, sterically hindered amines, amides of fatty acid, or other suitable tertiary, secondary, and primary amines and ammonia could be used in the fluids of the present disclosure.

In some embodiments, the amine stabilizer may be commercially available amine stabilizers such as PTS-200, or polyether amines polyether amines such as the JEFFAMINE series of polyether amines including Jeffamine D-230, all of which are available from M-I L.L.C. (Houston, Tex.). Amine stabilizers may be added to a wellbore fluid in accordance with the present disclosure at a concentration that ranges from 0.1% to 10% by weight of the wellbore fluid in some embodiments, and from 0.5% to 5% by weight of the wellbore fluid in other embodiments. Further, is also envisioned that the fluid may be buffered to a desirable pH using, for example, magnesium oxide. The compound serves as to buffer the pH of the drilling fluid and thus maintain the alkaline conditions under which the process of hydrolysis or degradation of the polymers is retarded.

The fluids may be formulated or mixed according to various procedures; however, in particular embodiments, the polymeric fluid loss control agent of the present disclosure may be yielded in fresh water prior to be added to a brine (or vice versa). Thus, after the polymer yields in fresh water, a brine (such as a divalent halide) may be combined with the yielded polymer. The gelling agent may be added to the yielded polymer either before, after, or simultaneous with the brine.

Upon mixing, the fluids of the present embodiments may be used in drilling operations. Drilling techniques are known to persons skilled in the art and involve pumping a drilling fluid into a wellbore through an earthen formation. The fluids of the present embodiments have particular application for use in high temperature environments. The drilling fluid formulations disclosed herein may possess high thermal stability, having particular application for use in environments of up to 450'F. In yet another embodiment, the fluids of the present disclosure are thermally stable for at least 16 hours, or for at least two days, or for at least five days at the elevated temperatures indicated above.

One embodiment of the present disclosure involves a method of drilling a wellbore. In one such illustrative embodiment, the method involves pumping a drilling fluid into a wellbore during the drilling through a reservoir section of the wellbore, and then allowing filtration of the drilling fluid into the earthen formation to form a filter cake on the wellbore walls. The filter cake is partially removed afterwards, thus allowing initiation of the production of hydrocarbons from reservoir. The formation of such a filter cake is desired for drilling, particularly in unconsolidated formations with wellbore stability problems and high permeabilities. Further, in particular embodiments, the fluids of the present disclosure may be used to drill the reservoir section of the well, and the open hole well may be subsequently completed (such as with placement of a screen, gravel packing, etc.) with the filter cake remaining in place. After the completion equipment is installed, removal of the filter cake may be achieved through use of a breaker fluid (or internal breaking agent).

In one or more embodiments, the fluids of the present disclosure may also find utility in coiled tubing applications where the high temperature stability of the fluid could be useful. Coiled tubing applications use a long metal pipe that can be spooled on large reels in a variety of downhole operations including well interventions, production operations, and in some instances drilling. Many of the operations that use coiled tubing may also be done by wireline. However, coiled tubing has the advantage of being able to be pushed into the wellbore rather than the reliance on gravity with wireline and also fluids may be pumped through the coiled tubing. In embodiments where the fluids of the present disclosure are used in coiled tubing applications a lubricant may be added to the wellbore fluids to reduce friction although, the crosslinked fluid-loss control additive may effectively act as a friction reducer when used in coiled tubing applications.

Breaker Fluids

After completion of the drilling or completion process, filter cakes deposited by drilling and treatment fluids may be broken by application of a breaker fluid that degrades the constituents of the filter cake. The breaker fluid may be circulated in the wellbore during or after the performance of the at least one completion operation. In other embodiments, the breaker fluid may be circulated either before, during, or after a completion operation has commenced to destroy the integrity of and clean up residual drilling fluids remaining inside casing or liners. The breaker fluid may contribute to the degradation and removal of the filter cake deposited on the sidewalls of the wellbore to minimize the possibility of negatively impacting production. Upon cleanup of the well, the well may then be converted to production.

The breaker fluids of the present disclosure may also be formulated to contain an acid source to decrease the pH of the breaker fluid and aid in the degradation of filter cakes within the wellbore. Examples of acid sources that may be used as breaker fluid additives include strong mineral acids, such as hydrochloric acid or sulfuric acid, and organic acids, such as citric acid, salicylic acid, lactic acid, malic acid, acetic acid, and formic acid. Suitable organic acids that may be used as the acid sources may include citric acid, salicylic acid, glycolic acid, malic acid, maleic acid, fumaric acid, and homo- or copolymers of lactic acid and glycolic acid as well as compounds containing hydroxy, phenoxy, carboxylic, hydroxycarboxylic or phenoxycarboxylic moieties. In one or more embodiments, before, during, or after a completion operation has started or upon conclusion of all completion operations, the circulation of an acid wash may be used to at least partially dissolve some of the filter cake remaining on the wellbore walls.

Other embodiments may use breaker fluids that contain hydrolysable esters of organic acids and/or various oxidizers in combination with or in lieu of an acid wash. Hydrolysable esters that may hydrolyze to release an organic (or inorganic) acid may be used, including, for example, hydrolyzable esters of a $C_1$ to $C_6$ carboxylic acid and/or a $C_2$ to $C_{30}$ mono- or poly-alcohol, including alkyl orthoesters. In one or more embodiments, mixtures of hydrolyzable esters of dicarboxylic acids may be used. In one or more embodiments, the mixtures of hydrolysable esters of dicarboxylic acids may contain $C_3$ to $C_8$ dicarboxylic acids. In one or more embodiments, the mixture of hydrolyzable esters of dicarboxylic acids may include about 57-67 wt. % dimethyl glutarate, 18-28 wt. % dimethyl succinate, and 8-22 wt. % dimethyl adipate. In addition to these hydrolysable carboxylic esters, hydrolysable phosphonic or sulfonic esters could be utilized, such as, for example, $R^1H_2PO_3$, $R^1R^2HPO_3$, $R^1R^2R^3PO_3$, $R^1HSO_3$, $R^1R^2SO_3$, $R^1H_2PO_4$, $R^1R^2HPO_4$, $R^1R^2R^3PO_4$, $R^1HSO_4$, or $R^1R^2SO_4$, where $R^1$, $R^2$, and $R^3$ are $C_2$ to $C_{30}$ alkyl-, aryl-, arylalkyl-, or alkylaryl-groups. One example of a suitable hydrolysable ester of carboxylic acid is available from M-I, L.L.C. (Houston, Tex.) under the name D-STRUCTOR.

In some instances, it may also be desirable to include an oxidant in the breaker fluid, to further aid in breaking or degradation of polymeric additives present in a filter cake. The oxidants may be used with a coating to delay their release or they may be used without a coating. Examples of such oxidants may include any one of those oxidative breakers known in the art to react with polymers such as polysaccharides to reduce the viscosity of polysaccharide-thickened compositions or disrupt filter cakes. Such compounds may include bromates, peroxides (including peroxide adducts), other compounds including a peroxy bond such as persulfates, perborates, percarbonates, perphosphates, and persilicates, and other oxidizers such as hypochlorites. In one or more embodiments, the oxidant may be included in the breaker fluid in an amount from about 1 ppb to 10 ppb. Further, use of an oxidant in a breaker fluid, in addition to affecting polymeric additives, may also cause fragmentation of swollen clays, such as those that cause bit balling.

In some instances, it may also be desirable to include chelants in the breaker fluid to help dissolve precipitates and other solids present in the filtercake. Chelating agents suitable for use in the breaker fluids of the present disclosure may include polydentate chelating agents such as ethylenediaminetetraacetic acid (EDTA), diethylenetriaminepentaacetic acid (DTPA), nitrilotriacetic acid (NTA), ethylene glycol-bis(2-aminoethyl)-N,N,N',N'-tetraacetic acid (EGTA), 1,2-bis(o-aminophenoxy)ethane-N,N,N',N'-tetraaceticacid (BAPTA), cyclohexanediaminete-traacetic acid (CDTA), triethylenetetraaminehexaacetic acid (TTHA), N-(2-Hydroxyethyl)ethylenediamine-N,N',N'-triacetic acid (HEDTA), glutamic-N,N-diacetic acid (GLDA), ethylenediamine tetra-methylene sulfonic acid (EDTMS), diethylene-triamine penta-methylene sulfonic acid (DETPMS), amino tri-methylene sulfonic acid (ATMS), ethylene-diamine tetra-methylene phosphonic acid (EDTMP), diethylene-triamine penta-methylene phosphonic acid (DETPMP), amino tri-methylene phosphonic acid (ATMP), and mixtures thereof. Such chelating agents may include potassium or sodium salts thereof in some embodiments. Particular examples of chelants that may be employed in certain embodiments include ethylenediaminetetraacetic acid (EDTA), glutamic acid diacetic acid (GLDA) (such as L-glutamic acid, N, N-diacetic acid) iminodiacetic acids and/or salts thereof. A commercially available example of chelants that may be used in breaker fluid formulations is D-SOLVER EXTRA, available from MI-LLC (Houston, Tex.). When included, chelants may be from about 5-20% by volume of the breaker fluid.

In general, the base fluid of a breaker fluid may be may be an aqueous medium selected from water or brine. In those embodiments of the disclosure where the aqueous medium is a brine, the brine is water comprising an inorganic salt or organic salt. The salt may serve to provide desired density to balance downhole formation pressures. In various embodiments of the breaker fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, zinc, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts.

In some embodiments, the base fluid for the breaker may be a divalent halide is selected from the group of alkaline earth halides or zinc halides. The brine may also comprise an organic salt, such as sodium, potassium, or cesium formate. Inorganic divalent salts include calcium halides, such as calcium chloride or calcium bromide. Sodium bromide, potassium bromide, or cesium bromide may also be used.

The salt may be chosen for compatibility reasons, i.e. where the reservoir drilling fluid used a particular brine phase and the breaker fluid brine phase is chosen to have the same brine phase.

In one or more embodiments, a breaker fluid according to the present disclosure may include about 15-30% by volume of hydrolysable esters of organic acids, 5-20% by volume of an organic acid, 5-20% by volume of chelants, with the remaining component of the formulation being brine.

It should be appreciated that the amount of delay between the time when a breaker fluid according to the present disclosure is introduced to a well and the time when the fluids have had the desired effect of breaking/degrading/dispersing the filter cake may depend on several variables. One of skill in the art should appreciate that factors such as the downhole temperature, concentration of the components in the breaker fluid, pH, amount of available water, filter cake composition, etc. may all have an impact. For example downhole temperatures can vary considerably from 100° F. to over 400° F. depending upon the formation geology and downhole environment. However, one of skill in the art via trial and error testing in the lab should easily be able to determine and thus correlate downhole temperature and the time of efficacy of for a given formulation of the breaker fluids disclosed herein. With such information one can predetermine the time period necessary to shut-in a well given a specific downhole temperature and a specific formulation of the breaker fluid.

EXAMPLES

The following examples are presented to illustrate the preparation and properties of the fluids and should not be construed to limit the scope of the disclosure, unless otherwise expressly indicated in the appended claims. All percentages, concentrations, ratios, parts, etc. are by weight unless otherwise noted or apparent from the context of their use.

Example 1—Comparison of Linear AMPS Copolymer with Crosslinked AMPS

In the following example, wellbore fluids containing a crosslinked AMPS polymer and/or a crosslinked PVP was assayed to determine the rheological properties, stability at elevated temperatures, as contrasted with a comparative formulation C1 containing a linear AMPS copolymer and a comparative formulation C2 containing only a crosslinked AMPS copolymer. The wellbore fluids were formulated as shown in Table 1, where polymer A is an AMPS polymer that has been crosslinked with 2% of chemical crosslinker and polymer B is crosslinked with 1% of a chemical crosslinker. Samples were formulated in a calcium bromide brine with defoamer, magnesium oxide, and selected sizes of SAFECARB particulate calcium carbonate. Prior to addition to the brine base fluid, polymers were first hydrated in a glycol solvent.

TABLE 1

Wellbore fluid formulations

| Sample | C1 | C2 | 3 | 4 |
|---|---|---|---|---|
| 14.2 CaBr$_2$ brine (bbls/bbl) | 0.80 | 0.77 | 0.80 | 0.80 |
| water (bbls/bbl) | 0.07 | 0.07 | 0.07 | 0.07 |
| glycol solvent (bbl/bbl) | 0.05 | 0.064 | 0.064 | 0.064 |
| defoamer (bbls/bbl) | 0.001 | 0.001 | 0.001 | 0.001 |

TABLE 1-continued

Wellbore fluid formulations

| Sample | C1 | C2 | 3 | 4 |
|---|---|---|---|---|
| crosslinked PVP (ppb) | 6.0 | — | 2.0 | 2.0 |
| MgO (lbs/bbl) | 5.0 | 5.0 | 5.0 | 5.0 |
| linear AMPS/acrylamide copolymer (lb/bbl) | 2.0 | — | — | — |
| crosslinked AMPS copolymer A (lb/bbl) | — | 8.0 | 5.0 | — |
| crosslinked AMPS copolymer B (lb/bbl) | — | — | — | 5.0 |
| SAFECARB 2 (lb/bbl) | 34.75 | 35.86 | 34.75 | 34.75 |
| SAFECARB 10 (lb/bbl) | 15.80 | 16.74 | 15.80 | 15.80 |
| SAFECARB 20 (lb/bbl) | 12.64 | 12.88 | 12.64 | 12.64 |

After combining the components, the initial rheology was studied, which was then followed by aging portions of the fluid under varying conditions. The thermal stability and performance of the formulations of this disclosure in controlling the filtrate loss from the drilling fluid were determined by conducting the following tests.

Rheology Test

Viscosity is a measurement describing the flow properties of drilling fluids and their behavior while under influence of shear stress. Using a Fann 35 Viscometer, Fann 70 Viscometer, Grace Viscometer, or other commercially available rheometer, the rheological parameters namely plastic viscosity (PV) and yield point (YP) are determined. One of skill in the art will appreciate that the viscosity measurements will be dependent upon the temperature of the gel composition, the type of spindle, and the number of revolutions per minute. Generally, increase in the plastic viscosity and yield point values are proportional to increase of the drilling fluid density, but the yield point increases by a smaller magnitude.

Plastic Viscosity Test

Plastic viscosity (PV) is one variable used in the calculation of viscosity characteristics of a drilling fluid, measured in centipoise (cP) units. PV is the slope of the shear stress-shear rate plot above the yield point and is derived from the 600 rpm reading minus the 300 rpm reading. A low PV indicates that the mud is capable of drilling rapidly because of the low viscosity of mud exiting at the bit. High PV is caused by a viscous base fluid and by excess colloidal solids. To lower PV, a reduction in solids content can be achieved by dilution.

Yield Point Test

Yield point (YP) is another variable used in the calculation of viscosity characteristics of drilling fluids, measured in pounds per 100 feet square (lb/100 ft$^2$). The physical meaning of the Yield Point (YP) is the resistance to initial flow. YP is used to evaluate the ability of mud to lift cuttings out of the annulus. The Bingham plastic fluid plots as a straight line on a shear-rate (x-axis) versus shear stress (y-axis) plot, in which YP is the zero-shear-rate intercept (PV is the slope of the line). YP is calculated from 300-rpm and 600-rpm viscometer dial readings by subtracting PV from the 300-rpm dial reading and it is reported as lbf/100 ft$^2$. A higher YP implies that drilling fluid has ability to carry cuttings better than a fluid of similar density but lower YP.

High Temperature High Pressure Fluid Loss Test

"HTHP" is the term used for high temperature high pressure fluid loss, measured in milliliters (mL) according to API bulletin RP 13 B-2, 1990. This test is conducted for testing fluid loss behavior of mud. Mud is pressed through filter paper located in the HTHP filter press at 300° F. with differential pressure at 500 psi for 30 minutes. Thickness of filter cake stuck in filter paper should be less than 2 ml.

Gel Strength Test

The gel strength (thixotropy) is the shear stress measured at low shear rate after a mud has set quiescently for a period of time (10 seconds and 10 minutes in the standard API procedure, although measurements after 30 minutes or 16 hours may also be made).

Components of each formulation were combined and rheology of the resulting fluid was measured using Fann 35 rheometer at different temperatures before and after hot rolling the fluids at 375° F. Results from the rheological study are tabulated in Table 2.

TABLE 2

Rheology of formulation C1

| | Fresh Fluid | Hot Rolled at 375° F for 16 Hours | | |
|---|---|---|---|---|
| RPM | 120° F. | 40° F. | 69° F. | 120° F. |
| 600 | 132 | 303 | 214 | 132 |
| 300 | 78 | 172 | 126 | 83 |
| 200 | 58 | 126 | 94 | 63 |
| 100 | 31 | 77 | 59 | 40 |
| 6 | 6 | 10 | 8 | 6 |
| 3 | 5 | 6 | 5 | 5 |
| 10 second gel | 4 | 5 | 5 | 4 |
| 10 minute gel | 6 | 6 | 5 | 5 |
| PV | 54 | 131 | 88 | 49 |
| YP | 24 | 41 | 38 | 34 |

Fluid loss tests were performed using 3 micron ceramic disc with 500 psi differential pressure at 375° F. after dynamically aging the fluids by hot rolling for 16 hours. The fluid loss data is shown in the Table 3. Fluid loss results for the comparative formulation C1 are shown in Table 3.

TABLE 3

Fluid loss data for C1

| Time | Fluid Loss |
|---|---|
| 1 minute | 3.5 ml |
| 5 minutes | 4.5 ml |
| 10 minutes | 5.0 ml |
| 15 minutes | 6.3 ml |
| 30 minutes | 7.0 ml |
| 1 hour | 8.7 ml |
| 2 hours | 11.5 ml |
| 4 hours | 14.0 ml |

Rheology of the comparative wellbore fluid was also studied. Long term thermal stability was tested by aging the fluid at 375° F. for 3 and 7 days. Rheological measurements were obtained 120° F. as in Table 4.

TABLE 4

Rheology of C1 after aging at 375° F.

| | Initial | 3 days static aging at 375° F. | 7 days static aging at 375° F. |
|---|---|---|---|
| RPM | | Rheology at 120° F. | |
| 600 | 130 | 126 | 113 |
| 300 | 83 | 81 | 71 |
| 200 | 64 | 63 | 55 |
| 100 | 41 | 40 | 35 |
| 6 | 8 | 6 | 6 |
| 3 | 6 | 4 | 4 |
| Top brine Separation | — | <10% | <15% |

To analyse the temperature stability of the Sample C2 formulation, a first sample of the fluid was hot rolled for 16 hours at 375° F., while a second was aged statically at 375° F. for 7 days. The rheology of the samples was measured with Fann 35 rheometer at a series of temperatures as tabulated in Table 5.

TABLE 5

Rheology of Sample C2

| RPM | Fresh Fluid 120° F. | 7 days at 375° F. 120° F. | Hot Rolled at 375° F. for 16 Hours | | |
|---|---|---|---|---|---|
| | | | 40° F. | 69° F. | 120° F. |
| 600 | 125 | 58 | 318 | 225 | 136 |
| 300 | 85 | 38 | 215 | 155 | 95 |
| 200 | 67 | 30 | 173 | 126 | 76 |
| 100 | 46 | 21 | 122 | 89 | 53 |
| 6 | 14 | 10 | 35 | 24 | 15 |
| 3 | 11 | 8 | 26 | 17 | 11 |
| 10 second | 6 | 7 | 25 | 17 | 12 |
| 10 minute | 8 | 8 | 25 | 16 | 13 |
| PV | 40 | 20 | 103 | 70 | 41 |
| YP | 45 | 18 | 112 | 85 | 54 |
| Top brine Separation | — | 18 to 26% | — | | |

After 7 days, aged samples exhibited a reduction in fluid viscosity, with a notable decrease in high end rheology (600 and 300 rpm, for example), with respect to that at lower rpm. A drop in the yield point of greater than 50% was also recorded. Fluid loss tests conducted at 375° F. with the fluid that has been heated aged at 375° F. for seven days. In addition, the fluid loss exhibited by the 7-day aged fluid approximated that of the 16-hour hot-rolled fluid as shown in Table 6.

TABLE 6

Fluid loss of Sample C2

| Time (min) | 16 hour aging | 7 day aging |
|---|---|---|
| 0 | 4 mL | 4 mL |
| 15 | 4.75 mL | 6 mL |
| 30 | 6 mL | 7.5 mL |
| 60 | 8 mL | 9.5 mL |

Wellbore fluid Sample C2 exhibited some phase separation of brine from the remainder of the components, referred to as "top brine separation," and a relatively low temperature yield point, which was modified by the addition of crosslinked PVP.

Rheology of Sample 3 at 120° F. is shown in Table 7. The above fluid formulation gives less top brine separation, but low end rheology after 16 hours is high. Sample 4 was also tested and the results are described Table 8.

TABLE 7

Rheology of Sample 2

| RPM | Initial | 16 hour hot roll at 375° F. | 7 days static aging at 375° F. |
|---|---|---|---|
| 600 | 153 | 154 | 83 |
| 300 | 108 | 115 | 57 |
| 200 | 83 | 98 | 46 |
| 100 | 61 | 73 | 35 |
| 6 | 14 | 24 | 18 |
| 3 | 11 | 18 | 12 |

TABLE 7-continued

Rheology of Sample 2

| RPM | Initial | 16 hour hot roll at 375° F. | 7 days static aging at 375° F. |
|---|---|---|---|
| 10 seconds | 14 | 17 | — |
| 10 minutes | 18 | 21 | — |
| PV | 45 | 39 | 26 |
| YP | 63 | 76 | 31 |
| Top Brine separation | — | — | <15% |

TABLE 8

Rheology of Sample 3 at 120° F.

| RPM | Fresh Fluid | 16 hours hot rolled fluid at 375° F. | 7 days static aging at 375° F. |
|---|---|---|---|
| 600 | 105 | 130 | 85 |
| 300 | 67 | 87 | 61 |
| 200 | 51 | 69 | 50 |
| 100 | 33 | 48 | 37 |
| 6 | 7 | 14 | 14 |
| 3 | 6 | 11 | 11 |
| 10 seconds | 7 | 12 | 10 |
| 10 minutes | 7 | 13 | 11 |
| PV | 38 | 43 | 24 |
| YP | 29 | 44 | 37 |
| Top brine separation | — | — | <15% |

The fluid loss of Sample 4 after dynamically aging the fluid for 16 hours was measured and the results are shown in Table 9.

TABLE 8

Fluid loss of Sample 4

| Time | Fluid loss volume |
|---|---|
| 1 minute | 3.5 ml |
| 5 minutes | 4.5 ml |
| 15 minutes | 5.0 ml |
| 30 minutes | 6.5 ml |
| 1 hour | 8.5 ml |
| 2 hours | 10.5 ml |
| 4 hours | 14.5 ml |

Example 3—Breaker Fluid Tests

In the next example, breaker tests were performed by building 4 hours filter cake using the Sample 4 formulation shown in Table 1. A 14.2 ppg breaker solution was prepared using different chemicals in a $CaBr_2/ZnBr_2$ brine, in the presence of an added corrosion inhibitor. The filter cake was soaked in the breaker at 375° F. for 7 days under 300 psi pressure. The breaker test results are summarized in Table 9.

TABLE 9

Results of breaker testing for filter cakes generated by the Sample 4 wellbore formulation

| Breaker Chemistry | Flow back percentage in production direction |
|---|---|
| 15% Formic acid | 40% |
| 15% Formic acid | 0 |
| 20% Formic acid | 10% |

TABLE 9-continued

Results of breaker testing for filter cakes generated by the Sample 4 wellbore formulation

| Breaker Chemistry | Flow back percentage in production direction |
|---|---|
| 5% Formic acid | 0 |
| 10% Hydrogen Peroxide | 0 |

In the second test with 15% Formic acid, there was no flow back in production direction, and despite disruption of the filter cake from the surface of the filter disk, the presence of colored precipitates was observed and it is believed that that calcium formate was formed from the reaction between calcium carbonate and formic acid.

Example 4—Tests of High Temperature Stability

In the following example, a wellbore fluid containing a branched and crosslinked AMPS acrylamide co-polymer was tested to determine its rheological properties and their stability at elevated temperatures. The wellbore fluid of Sample 5 was formulated as shown in Table 10. In Table 10 DEFOAM-X is a defoamer used for foam control and is available from MI-LLC (Houston, Tex.), ECF-1868 is a crosslinked AMPS acrylamide co-polymer available from M-I LLC (Houston, Tex.), SAFECARB is a calcium carbonate available from MI-LLC (Houston, Tex.) and is added to provide the fluid with bridging solids, MgO is added to act as a pH buffer for the fluid.

TABLE 10

Formulation of Sample 5

| Additives | Concentration |
|---|---|
| 14.2 ppg CaBr$_2$ brine | 0.57 bbl/bbl |
| Water | 0.28 bbl/bbl |
| DEFOAM-X | 0.35 ppb |
| ECF-1868 | 9.0 ppb |
| Dry CaBr$_2$ | 55.0 ppb |
| MgO | 3.0 ppb |
| SafeCarb | 81.0 ppb |

To analyse the temperature stability of the Sample 5 formulation, a first portion of the fluid was hot rolled for 16 hours at 356° F., while a second portion was aged statically for 16 hours at 356° F., while a third portion was aged statically at 356° F. for 7 days. The rheology of the samples was measured with Fann 35 rheometer at a temperature of 120° F. as tabulated in Table 11.

TABLE 11

Rheology of Sample 5

| Rheology @ 120° F. | Fresh Fluid | After 16 hours hot rolled @ 356° F. | After 16 hours static aged @ 356° F. | After 7 days static aged @ 356° F. |
|---|---|---|---|---|
| 600 | 117 | 121 | 122 | 122 |
| 300 | 78 | 81 | 82 | 87 |
| 200 | 62 | 65 | 65 | 73 |
| 100 | 40 | 44 | 43 | 51 |
| 6 | 10 | 11 | 11 | 10 |
| 3 | 7 | 8 | 8 | 7 |

The fluid of Sample 5 that was hot rolled for 16 hours was also subjected to HTHP Fluid Loss testing and the results are shown in table 12 below.

TABLE 12

Fluid Loss of Sample 5

| Time (min) | New (ml) |
|---|---|
| Spurt | 2.5 |
| 15 | 4.0 |
| 30 | 5.2 |
| 60 | 6.5 |
| 960 (16-hr) | 18.0 |

In the following example, a wellbore fluid containing a branched and crosslinked AMPS acrylamide co-polymer was tested to determine its rheological properties and its stability at elevated temperatures. The wellbore fluid of Sample 6 was formulated as shown in Table 13. In Table 13, DEFOAM-X is a defoamer used for foam control and is available from MI-LLC (Houston, Tex.), ECF-1868 is a crosslinked AMPS acrylamide co-polymer available from MI-LLC (Houston, Tex.), SAFECARB is a calcium carbonate available from MI-LLC (Houston, Tex.) and is added to provide the fluid with bridging solids, PTS-200 is a pH-buffer and temperature stabilizer available from MI-LLC (Houston, Tex.), SAFE-SCAV NA is a liquid bisulfite-base additive available from MI-LLC (Houston, Tex.), SAFE-SCAV-HSW is an organic hydrogen sulfide scavenger and is available from MI-LLC (Houston, Tex.), CONQOR 303A is a corrosion inhibitor that is available from MI-LLC (Houston, Tex.), SP-101 is a sodium polyacrylate copolymer and is available from MI-LLC (Houston Tex.).

TABLE 13

Formulation of Sample 6

| Products | Concentration (Lb/bbl.) |
|---|---|
| Dry NaCl | 40.46 |
| Water | 286.37 |
| DEFOAM-X | 0.35 |
| ECF 1868 | 6.0 |
| PTS 200 | 3 |
| SAFE-SCAV NA | 0.1 |
| SAFE-SCAV HSW | 2 |
| CONQOR 303A | 2 |
| SAFECARB 2 | 26 |
| SAFECARB 10 | 24 |
| Barite | 80 |
| SP 101 | 0.1 |

To analyse the temperature stability of the Sample 6 formulation, a first portion of the fluid was hot rolled for 16 hours at 380° F., while a second portion was hot rolled for 3 days at 380° F., while a third portion was aged statically for 3 days at 380° F., while a fourth portion was aged statically at 380° F. for 6 days. The rheology of the samples was measured with Fann 35 rheometer at a temperature of 120° F. as tabulated in Table 14.

TABLE 14

Rheology of Sample 6

| Temperature | 120° F. | 120° F. | 120° F. | 120° F. | 120° F. |
|---|---|---|---|---|---|
| 600 rpm | 81 | 107 | 108 | 111 | 80 |
| 300 rpm | 56 | 76 | 77 | 77 | 56 |
| 200 rpm | 44 | 62 | 63 | 63 | 47 |
| 100 rpm | 30 | 44 | 45 | 45 | 33 |
| 6 rpm | 8 | 13 | 14 | 16 | 13 |
| 3 rpm | 7 | 11 | 11 | 14 | 11 |

TABLE 14-continued

| Rheology of Sample 6 | | | | | |
|---|---|---|---|---|---|
| Gels 10", Lb/100 ft² | 7 | 10 | 10 | 12 | 10 |
| Gels 10', Lb/100 ft² | 7 | 11 | 10 | 13 | 11 |
| PV, cP | 25 | 31 | 31 | 34 | 24 |
| YP, Lb/100 ft² | 31 | 45 | 46 | 43 | 32 |
| pH | 9.46 | 9.30 | 9.30 | 9.20 | 9.20 |

In the following example, a coiled-tubing fluid containing a branched and crosslinked AMPS acrylamide co-polymer was tested to determine its rheological properties and its stability at elevated temperatures. The wellbore fluid of Sample 7 was formulated as shown in Table 15. In Table 15, DEFOAM-X is a defoamer used for foam control and is available from MI-LLC (Houston, Tex.), ECF-1868 is a crosslinked AMPS acrylamide co-polymer available from MI-LLC (Houston, Tex.), PTS-200 is a pH-buffer and temperature stabilizer available from MI-LLC (Houston, Tex.), DI-LOK is a fluid rheology stabilizer available from MI-LLC (Houston, Tex.).

TABLE 15

| Formulation of Sample 7 | |
|---|---|
| Products | Concentration |
| Dry NaCl | 87.5 ppb |
| Water | 0.871 bbl/bbl |
| DEFOAM-X | 0.3535 ppb |
| ECF 1868 | 8.0 ppb |
| PTS 200 | 2.0 ppb |
| DI-LOK | 5.0 ppb |

To analyse the temperature stability of the Sample 7 formulation, a first portion of the fluid was hot rolled for 16 hours at 330° F., while a second portion was hot rolled for 48 hours at 330° F., while a third portion was aged statically for 16 hours at 330° F., while a fourth portion was aged statically at 330° F. for 48 hours. The rheology of the samples was measured with Fann 35 rheometer at a temperature of 120° F. as tabulated in Table 14.

TABLE 14

| Rheology of Sample 7 | | | | | |
|---|---|---|---|---|---|
| Fann-35 rheology | Fresh | Hot rolled at 330° F. | | Static aged at 330° F. | |
| @ 120° F. | Fluid | 16 hours | 48 Hours | 16 hours | 48 hours |
| 600 | 76 | 87 | 87 | 77 | 78 |
| 300 | 53 | 61 | 60 | 52 | 54 |
| 200 | 42 | 49 | 48 | 42 | 43 |
| 100 | 29 | 34 | 34 | 28 | 30 |
| 6 | 9 | 10 | 10 | 8 | 9 |
| 3 | 7 | 8 | 8 | 6 | 7 |
| PV | 23 | 26 | 27 | 25 | 24 |
| YP | 30 | 35 | 33 | 27 | 30 |
| pH | 9.22 | 9.29 | 9.26 | 9.42 | 9.21 |
| LSRV @ 0.0636 sec−1 @ 120° F. using Brookfield viscometer | 37199 | 35000 | 36492 | 30394 | 36292 |

The rheology of the fluid of Sample 7 that was hot rolled at 330° F. for 16 hours was measured with a Fann 35 and Grace rheometer at several temperatures as tabulated in Table 15 below.

TABLE 15

| Rheology of Sample 7 | | | | | |
|---|---|---|---|---|---|
| | 120° F. | 200° F. | 200° F. | 300° F. | 330° F. |
| | Fann 35 | Grace | Grace | Grace | Grace |
| 600 | 87 | 89 | 62 | 51 | 45 | 39 |
| 300 | 61 | 62 | 42 | 35 | 31 | 27 |
| 200 | 49 | 49 | 34 | 28 | 24 | 26 |
| 100 | 34 | 34 | 23 | 19 | 17 | 15 |
| 6 | 10 | 10 | 8 | 6 | 5 | 7 |
| 3 | 8 | 8 | 6 | 5 | 5 | 7 |

In the following example, a wellbore fluid containing a branched and crosslinked AMPS acrylamide co-polymer was tested to determine its rheological properties and its stability at elevated temperatures. The wellbore fluid of Sample 8 was formulated as shown in Table 16. In Table 16, ECF-1868 is a crosslinked AMPS acrylamide co-polymer available from MI-LLC (Houston, Tex.), PTS-200 is a pH-buffer and temperature stabilizer available from MI-LLC (Houston, Tex.), SAFE-SCAV-HS is an organic hydrogen sulfide scavenger and is available from MI-LLC (Houston, Tex.), CALOTHIN is a liquid anionic acrylic copolymer that provides rheology control and is available from MI-LLC (Houston, Tex.), and POROSEAL is a copolymer filtration control additive available from MI-LLC (Houston, Tex.).

TABLE 16

| Formulation of Sample 8 | |
|---|---|
| Additives | Concentration |
| Water | 246.50 ppb |
| Soda Ash | 0.50 ppb |
| Sodium Chloride | 61.63 ppb |
| ECF-1868 | 5.0 ppb |
| PTS-200 | 3.0 ppb |
| SafeScav HS | 1.0 ppb |
| Calothin | 0.15 ppb |
| Poroseal | 10.50 ppb |
| Barite UF | 218.72 ppb |

To analyse the temperature stability of the Sample 8 formulation, a portion of the fluid was hot rolled for 16 hours at 420° F. The rheology of the sample was measured with Fann 35 rheometer at a temperature of 120° F. as tabulated in Table 17.

TABLE 17

| Rheology of Sample 8 | | |
|---|---|---|
| Rheology @ 120° F. | Fresh Fluid | After 16 hours hot rolled at 420° F. |
| 600 | 72 | 74 |
| 300 | 48 | 49 |
| 200 | 35 | 36 |
| 100 | 24 | 25 |
| 6 | 8 | 7 |
| 3 | 6 | 6 |

Example 5—Viscosity Difference Between Linear and Crosslinked and Branched Polymer In this example, 2 wt. % of a co-polymer formed from an acrylamide monomer and a sulfonated anionic monomer was dispersed in 2 wt. % $CaBr_2$ salt solution and the viscosity was measured on a Brookfield viscometer. The results are shown in Table 18 below. In one sample the co-polymer was a linear co-polymer, while in the other sample the co-polymer was crosslinked and branched.

TABLE 18

| Viscosity Results | | | | |
|---|---|---|---|---|
| Polymer | 1.5 rpm | 6.0 rpm | 30.0 rpm | 60.0 rpm |
| Crosslinked and Branched | 3700 cps | 1350 cps | 480 cps | 320 cps |
| Linear Polymer | Too low to measure | Too low to measure | 78 cps | 74 cps |

Advantageously, embodiments of the present disclosure provide wellbore fluids and associated methods using such fluids that include a crosslinked polymeric fluid loss control agent. The drilling fluids of the present disclosure may advantageously be stable in HTHP conditions and prevent wellbore fluid loss up to temperatures of 375° F. or even up to 450° F. in some embodiments, whereas use of conventional fluid loss control additives may begin to experience degradation at lower temperatures. Additionally, use of drilling fluids containing a polymeric fluid loss control agent comprising an acrylamide and a sulfonated anionic monomer and a gelling material containing a clay and a crosslinked polyvinylpyrrolidone may prevent wellbore fluid loss into the formation by forming a filter cake on the wellbore walls upon filtration of the drilling fluid into the earthen formation. The use of two gelling materials, namely a clay and a crosslinked polyvinylpyrrolidone, has a synergistic effect on the rheological properties of the drilling fluid, depicted in superior viscosity and gel strength properties, as well as improved fluid loss control.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method of drilling a wellbore, comprising:
   pumping an alkaline wellbore fluid into a wellbore through an earthen formation, the alkaline wellbore fluid comprising:
   a base fluid; and
   a crosslinked and branched polymeric fluid loss control agent formed from at least an acrylamide monomer and a sulfonated anionic monomer;
   wherein the fluid loss control agent has an extent of crosslinking that is selected so that the fluid loss control agent has a viscosity that is within a peak viscosity response of a viscosity response curve, wherein the peak viscosity response is defined as having an amount of crosslinker that correlates to the peak viscosity amount plus or minus the amount of crosslinker that correlates to up to 75% of the area under the viscosity response curve, and wherein the viscosity response curve for the crosslinked and branched polymeric fluid loss control agent is determined by plotting viscosity as a function of crosslinker under otherwise constant conditions; and
   operating a drilling tool in the wellbore during the pumping.

2. The method of claim 1, wherein the wellbore fluid is pumped into the wellbore during the drilling through a reservoir section of the wellbore.

3. The method of claim 1, wherein during the pumping, allowing filtration of the drilling fluid into the earthen formation to form a filter cake on the wellbore walls.

4. The method of claim 3, further comprising:
   at least partially removing the filter cake by circulating a breaker fluid that comprises a mixture of hydrolyzable esters of dicarboxylic acids, the mixture including dimethyl glutarate, dimethyl succinate, and dimethyl adipate.

5. The method of claim 4, further comprising:
   initiating production of hydrocarbons from the reservoir.

6. The method of claim 1, wherein the acrylamide monomer is at least one selected from unsubstituted acrylamide, alkylacrylamides, N-methylol acrylamide, N-isopropyl acrylamide, diacetone-acrylamide, N-alkyl acrylamide, where alkyl is $C_1$ to $C_{14}$, N,N-dialkyl acrylamides, where alkyl is $C_1$ to $C_{14}$, and N-cycloalkane acrylamides.

7. The method of claim 1, wherein the sulfonated anionic monomer is selected from 2-acrylamide-2-methyl-propane-sulfonic acid, vinyl sulfonate, and styrene sulfonic acid.

8. The method of claim 1, wherein the crosslinked and branched polymeric fluid loss control agent is dispersed in a glycol solvent prior to addition to the wellbore fluid.

9. The method of claim 1, wherein the wellbore fluid further comprises a crosslinked polyvinylpyrrolidone.

10. The method of claim 1, wherein the amount of crosslinker correlates to the peak viscosity amount plus or minus the amount of crosslinker that correlates to up to 50% of the area under the viscosity response curve.

11. The method of claim 10, wherein the amount of crosslinker correlates to the peak viscosity amount plus or minus the amount of crosslinker that correlates to up to 25% of the area under the viscosity response curve.

12. The method of claim 1, wherein a percentage of intermolecular crosslinking ranges from 0.25% to 10%.

13. The method of claim 12, wherein the wellbore fluid exhibits low end rheology that does not deviate by more than 30 percent under a temperature up to 300° F. when compared to low end rheology of the fluid at temperatures below about 250° F.

14. The method of claim 12, wherein after aging the wellbore fluid for at least 5 days at a temperature of at least 300° F., the rheology of the wellbore fluid at 3 rpm, when tested at 120° F., is at least 5.

15. A method of drilling a wellbore, comprising:
pumping an alkaline wellbore fluid into a wellbore through an earthen formation, the alkaline wellbore fluid comprising:
   a base fluid; and
   a crosslinked and branched polymeric fluid loss control agent formed from at least an acrylamide monomer and a sulfonated anionic monomer;
   wherein the fluid loss control agent has an extent of crosslinking that is selected so that the fluid loss control agent has a viscosity that is within a peak viscosity response of a viscosity response curve, wherein the peak viscosity response correlates to an amount of crosslinker that results in the peak amount plus or minus 50% of the peak amount, and wherein the viscosity response curve for the crosslinked and branched polymeric fluid loss control agent is determined by plotting viscosity as a function of crosslinker under otherwise constant conditions; and
operating a drilling tool in the wellbore during the pumping.

16. The method of claim 15, wherein the amount of crosslinker results in the peak amount plus or minus 30% of the peak amount.

17. The method of claim 16, wherein the amount of crosslinker results in the peak amount plus or minus 20% of the peak amount.

18. A method of drilling a wellbore, comprising:
pumping an alkaline wellbore fluid into a wellbore through an earthen formation, the alkaline wellbore fluid comprising:
   a base fluid; and
   a crosslinked and branched polymeric fluid loss control agent formed from at least an acrylamide monomer and a sulfonated anionic monomer;
   wherein the fluid loss control agent has an extent of crosslinking that is selected so that the fluid loss control agent has a viscosity that is within a peak viscosity response of a viscosity response curve, wherein the peak viscosity response correlates to an amount of crosslinker that results in the peak amount plus or minus 1.5 standard deviation from the peak amount, and wherein the viscosity response curve for the crosslinked and branched polymeric fluid loss control agent is determined by plotting viscosity as a function of crosslinker under otherwise constant conditions; and
operating a drilling tool in the wellbore during the pumping.

19. The method of claim 18, wherein the amount of crosslinker results in the peak amount plus or minus 1.0 standard deviation from the peak amount.

20. The method of claim 19, wherein the amount of crosslinker results in the peak amount plus or minus 0.5 standard deviation from the peak amount.

* * * * *